Feb. 26, 1924.  1,484,740
T. RUBINO
FAUCET
Filed Oct. 16, 1922
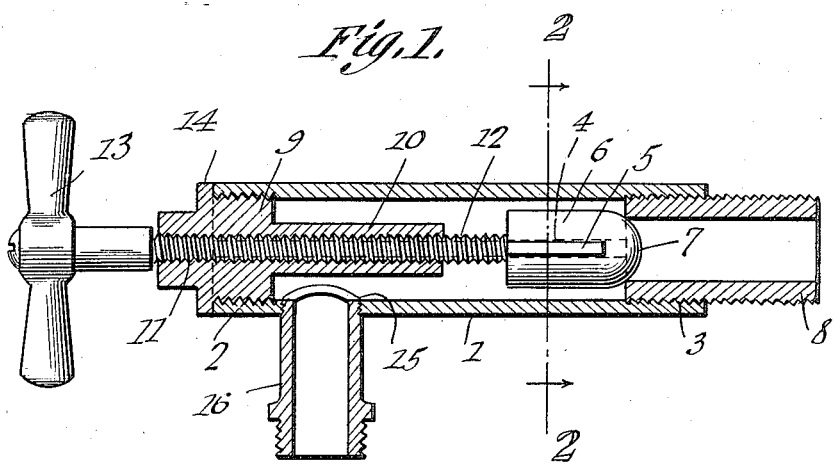
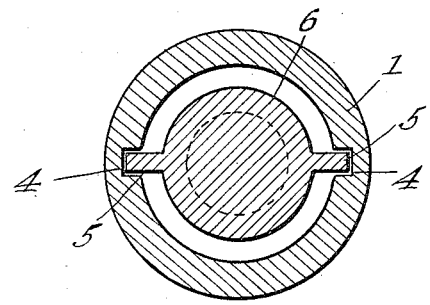
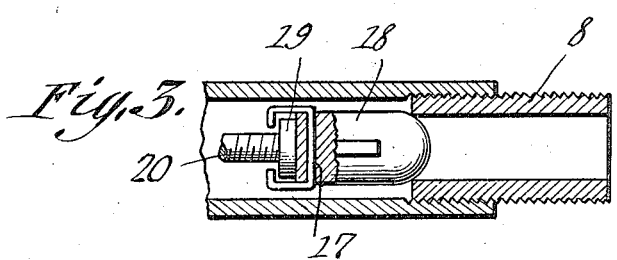
Inventor
T. Rubino Patented Feb. 26, 1924.

1,484,740

UNITED STATES PATENT OFFICE.

THOMAS RUBINO, OF HAZLETON, PENNSYLVANIA.

FAUCET.

Application filed October 16, 1922. Serial No. 594,858.

*To all whom it may concern:*

Be it known that I, THOMAS RUBINO, a citizen of the United States, residing at Hazleton, in the county of Luzerne and State of Pennsylvania, have invented a new and useful Faucet, of which the following is a specification.

This invention relates to a faucet, one of its objects being to provide a device of this character which can be cheaply manufactured and which does not require the use of washers.

Another object is to provide a faucet the valve of which is held to its seat against the pressure of the water or other fluid by an adjustable controlling screw.

With the foregoing and other objects in view which will appear as the description proceeds, the invention resides in the combination and arrangement of parts and in the detaails of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Figure 1 is a longitudinal section through the faucet.

Figure 2 is a section on line 2—2, Figure 1.

Figure 3 is a section through a portion of a modified form of faucet.

Referring to the figures by characters of reference 1 designates a section of pipe the ends of which are interiorly screw threaded as indicated at 2 and 3. Opposed longitudinal grooves 4 are formed in the inner surface of the pipe and constitute guides for wings 5 provided on the side of a valve 6. This valve is preferably cylindrical with one end rounded as shown at 7 and said rounded end is adapted to bear against one end of a short pipe section or nipple 8 screwed into engagement with the threads 3 and projecting beyond the pipe 1 for engagement with a supply pipe. A screw plug 9 is seated in the other end of the pipe 1 and has an elongated stem 10 arranged longitudinally within the pipe 1. A screw threaded passage 11 is extended longitudinally through the screw plug and its stem and projecting through this passage is an adjusting screw 12 having a head 13 at its outer end whereby it can be turned readily. This screw is adapted to bear against one end of the valve 6 so as to force the rounded end 7 thereof tightly into engagement with the end of the nipple 8 and prevent the flow of fluid past the valve. An annular flange 14 is preferably formed on the screw plug 9 for abutting tightly against the end of the pipe 1 to seal it.

Pipe 1 has an outlet opening 15 adjacent plug 9 and screwed into this opening is a short pipe section 16 constituting the outlet of the faucet.

It will be noted that by tightening the screw 12 against the valve 6 said valve can be held to its seat against the water or other fluid pressure in the nipple 8. The binding action of the valve upon its seat will prevent leakage of the fluid. By giving a slight turn to the screw 12 in one direction the valve 6 will be forced off of its seat by the pressure of fluid and said fluid will thus be free to flow to the outlet 16. The wings 5 prevent the valve from rotating and the threaded connections between the parts prevent leakage and obviate the use of packing. As no washers are necessary on the valve 6 the parts can be used almost indefinitely without renewing.

When using the faucet in connection with some fluids, such as oil, the valve might have a tendency to stick to its seat, particularly if the fluid is under but slight pressure. To insure unseating of the valve under these conditions a pin 17 can be extended diametrically through the valve 18 as shown in Figure 3 and the ends of this pin can be bent inwardly back of a collar 19 secured to the threaded stem or screw 20. Thus when the screw 20 is turned in one direction the collar will pull through the pin or wire 17 so as to forcibly unseat the valve.

What is claimed is:—

In a faucet the combination with a pipe section, a nipple secured in one end thereof and providing a seat and a plug secured in the other end thereof and having a stem, there being a groove within said pipe section and an outlet in said section between the nipple and plug, of a screw extending through the plug and stem, a one piece valve between the screw and seat, wings thereon slidably seated in the grooves, a collar on the screw, and a pin extended diametrically through the valve and having inturned ends embracing the collar.

In testimony that I claim the foregoing as my own, I have hereto affixed my signature in the presence of two witnesses.

THOMAS RUBINO.

Witnesses:
R. LEWIS PERNA,
FRANK PICCIANO.